INVENTORS
JULIO G. YANEZ-PASTOR
JENNY YANEZ-PASTOR
BY
Joseph F. Cole
ATTORNEY

Sept. 16, 1969   J. G. YANEZ-PASTOR ET AL   3,466,999
KITCHEN UTENSIL
Filed Sept. 14, 1967   2 Sheets-Sheet 2
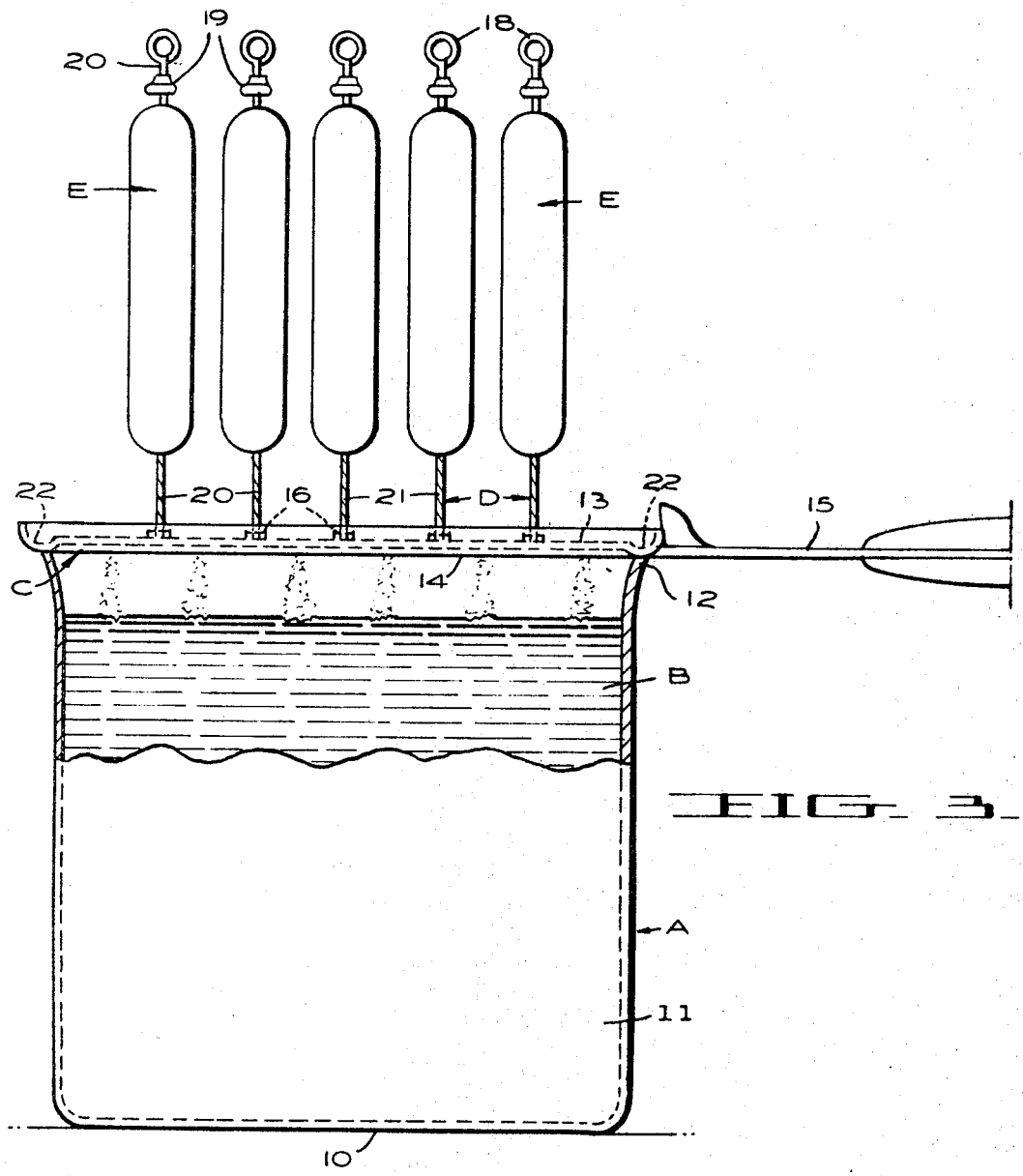
INVENTORS
JULIO G. YANEZ-PASTOR
JENNY YANEZ-PASTOR
BY
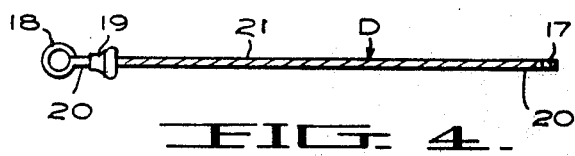
ATTORNEY 3,466,999
KITCHEN UTENSIL
Julio G. Yanez-Pastor and Jenny Yanez-Pastor, Pacifica, Calif. (Both of 369 Skyline Drive, Daly City, Calif. 94015)
Filed Sept. 14, 1967, Ser. No. 667,748
Int. Cl. A47j 37/12, 36/16
U.S. Cl. 99—413                          4 Claims

ABSTRACT OF THE DISCLOSURE

A kitchen utensil provided with a container for holding a cooking medium, and a lid dimensioned for resting on the marginal rim of the container, the lid having a plurality of skewer pins projecting from one face thereof, each pin being made to have an article of food impaled thereon, the pins and food articles projecting downwardly into the cooking medium when one face of the lid rests on the container rim, and the lid being reversible so that the impaled articles of food will extend upwardly for cooling when the opposite face of the lid is rested on the container rim. The pins are made to hold the articles of food out of contact with one another and out of contact with the container walls.

Summary

An object of our invention is to provide a cooking utensil having a container for holding a cooking medium, and a lid that may be positioned over the marginal rim of the container in either of two positions. The lid is provided with a plurality of skewer pins projecting from one face of the lid so that articles of food may be impaled thereon, and when the lid is applied over the container in one position, the pins and impaled articles of food will extend downwardly into the cooking medium for cooking operations. However, the lid may be reversed so that the skewer pins extend upwardly, thus holding the impaled articles of food out of the cooking medium and thus the food articles may be cooled prior to being consumed.

Another object of our invention is to provide a cooking utensil in which the skewer pins are spaced sufficiently from one another so that the articles of food impaled thereon will be held out of contact with one another, thus permitting all surfaces of the food to be cooked, the pins further holding the food articles out of contact with the bottom and side walls of the container.

Other objects and advantages will appear as the specification proceeds, and the novel features of the invention will be pointed out in the appended claims.

Brief description of the drawings

For a better understanding of our invention, reference should be had to the accompanying drawings, forming part of this specification, in which:

FIG. 3 is an elevational view, partly in section, disclosing the lid inverted so that the impaled articles of food will extend upwardly for cooling; and FIG. 4 is an elevational view of one of the skewer pins.

Figure 1:
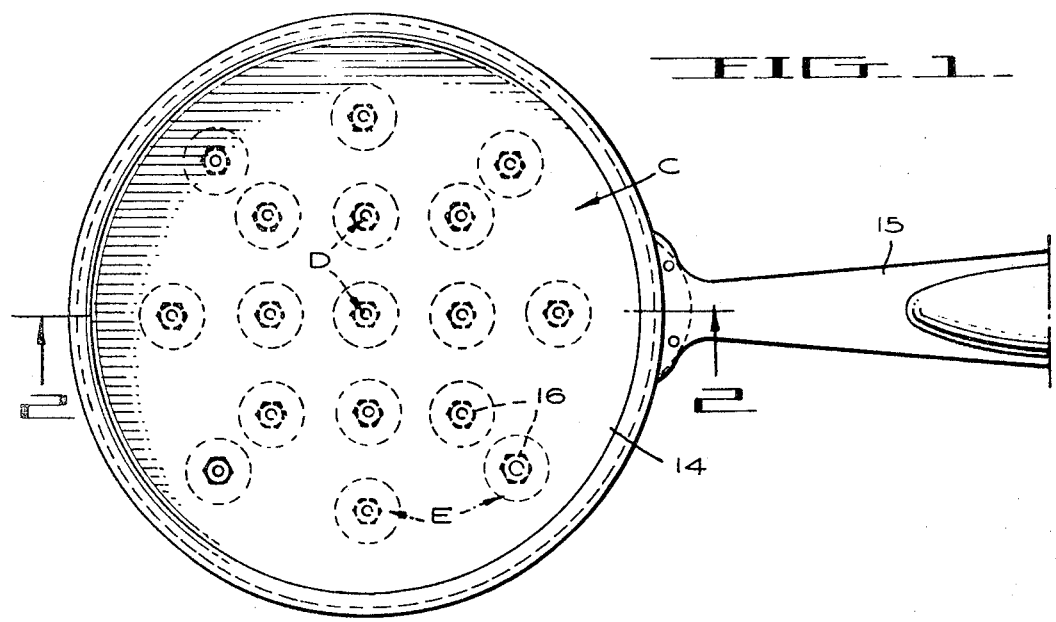
FIG. 1 is a top plan view of our kitchen utensil.

While we have shown only the preferred embodiment of our invention, it should be understood that various changes, or modifications, may be made within the scope of the appended claims without departing from the spirit thereof.

Description of the preferred embodiment

Referring now to the drawings in detail, we provide a container indicated generally at A for holding a cooking medium B, such as cooking oil and in some cases water, this depending upon the type of food to be cooked with the utensil. The container defines bottom and side walls 10 and 11 respectively, and a marginal rim 12 at its top.

Moreover, a lid designated generally at C is provided and having opposite faces 13 and 14, respectively, the former being generally regarded as the underneath face and the latter as the upper face of the lid. Each face is dimensioned for resting on the marginal rim 12 (see FIGS. 2 and 3), thus providing a cover over the container A in either position.

It will be noted that a plurality of skewer pins D are provided, each being made to have an article of food E impaled thereon for support thereby. The article of food may be Frankfurter (hot dog), meat roll, chicken part, etc., and we do not wish to be limited in this respect.

As the specification continues, it will be apparent that means are provided for connecting one end of each skewer pin D to the lid C, with all of them projecting from the same face 13 of the lid, and with the pins being spaced sufficiently from each other so that the articles of food E impaled thereon will be held out of contact with one another, as well as being spaced from the bottom and side walls 10 and 11, respectively, of the container A.

Figure 2:
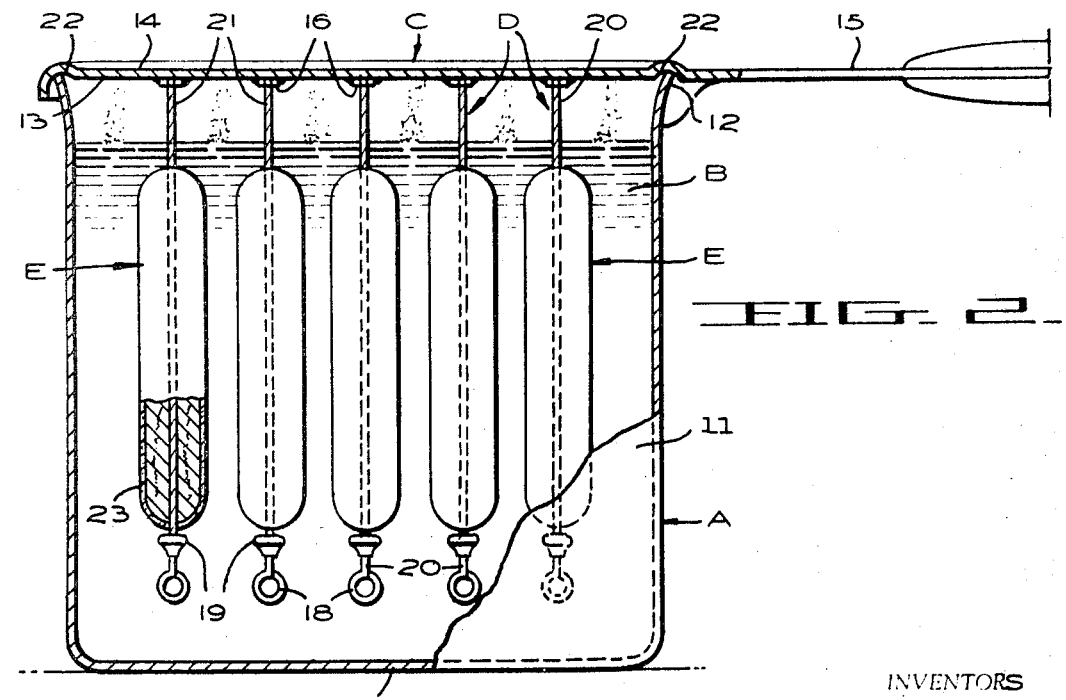
FIG. 2 is a vertical sectional view taken along the plane 2—2 of FIG. 1, with parts being shown in elevation.

With particular reference to FIG. 2, it will be seen that the skewer pins D have sufficient length so as to immerse the impaled articles of food E in the cooking medium B for a cooking operation, when the face 13 of the lid C rests on the marginal rim 12 of the container A, these pins being located and dimensioned to hold the impaled articles of food in the positions shown in FIG. 2 during the cooking operation.

As illustrated in FIGS. 1, 2 and 3, a handle 15 is secured to the lid C so that the impaled articles of food E may be lowered into the container A for the cooking operation, the lid being movable by raising the handle 15 so as to withdraw the impaled articles of food from the container so that the lid may be turned upside down and the opposite face 14 of the lid C may be rested on the marginal rim 12 of the container A (see FIG. 3), with the pins D projecting upwardly, whereby the articles of food E may be cooled and removed from the pins D.

Each skewer pin D is detachably connected to the lid C so that an article of food E may be impaled over the detached pin prior to the cooking operation, and each pin and the cooked article of food thereon may be handled individually for serving of the food article. For this purpose, a plurality of nuts 16 are secured to the face 13 of the lid C by any suitable means, for instance, welding, and each skewer pin has a threaded end 17 (see FIG. 4) that may be screwed into a selected nut 16 so as to detachably support the pin from the lid.

As illustrated in FIGS. 2, 3 and 4, each skewer pin D is provided with a handle 18 of any desired size and shape, with the handle being positioned beyond the article of food E impaled thereon, whereby the pin may be rotated when securing the pin to a nut 16, or removing the pin therefrom.

Moreover, a limit stop 19 is secured to each pin D between the handle 18 on that pin and the article of food E impaled on the pin, whereby the handle 18 on the pin will be exposed for grasping by a person without interference by the impaled article of food.

In its structural features, each skewer pin D has sufficient length so that both end portions 20 thereof may extend longitudinally beyond the article of food E impaled thereon, with these end portions serving as lifting handles for the article of food. Each pin has twists 21 formed thereon to engage with the impaled article of food E so as to resist sliding of the latter along the length of the pin.

As shown in FIGS. 2 and 3, the lid C is provided with a circumferential groove 22 in its face 13 from which the skewer pins D project, this groove being positioned to fit over the marginal rim 12 of the container A when the pins project downwardly into the cooking medium B (see FIG. 2), and this groove is located to circumscribe all of the pins D when the lid C is inverted so that the pins project upwardly (see FIG. 3), and thus the cooking medium may drain from the articles of impaled food E and flow into the groove and be caught thereby.

Any suitable batter, for instance a corn mixture 23 (see FIG. 2) may be applied over the food article, such as a frankfurther, after the skewer pins D are connected to the nuts 16. Thus all of the impaled articles of food E may be dipped into the batter, or other mixture, while supported by the lid C and using the handle 15 for moving the lid about.

Container A and lid C may form a pressure cooker, if desired, in which event a relief valve (not shown) would be provided.

We claim:

1. In a kitchen utensil:
   (a) a container made for holding a cooking medium, the container defining bottom and side walls and a marginal rim at its top;
   (b) a lid having opposite faces, each being dimensioned for resting on the marginal rim of the container to provide a cover thereover;
   (c) a plurality of skewer pins, each being made for having an article of food impaled thereon for support thereby;
   (d) means connecting one end of each skewer pin to the lid, with all of them projecting from the same face of the lid, and with the pins being spaced sufficiently from each other so that the articles of food impaled thereon will be held out of contact with one another;
   (e) the skewer pins having sufficient length so as to immerse the impaled articles of food in the cooking medium for a cooking operation, when that face of the lid from which the pins project is rested against the marginal rim of the container, these pins being located and dimensioned so as to hold the impaled articles of food at this time out of contact with the bottom and side wills of the container;
   (f) and a handle secured to the lid so that the impaled articles of food may be lowered into the container for the cooking operation, and the lid being movable by raising the handle so as to withdraw the impaled articles of food from the container so that the lid may be turned upside down and the opposite face of the lid may be rested on the marginal rim of the container, with the pins projecting upwardly, whereby the articles of food may be cooled and removed from the pins;
   (g) said means connecting the skewer pins to the lid being provided by a plurality of nuts secured to the lid, and each skewer pin having a threaded end that may be screwed into a selected nut so as to detachably support the pin from the lid.

2. The kitchen utensil, as set forth in claim 1;
   (h) and in which the opposite end of each pin is provided with a handle positioned beyond the article of food impaled thereon, whereby the pin may be rotated when securing the pin to a nut, or removing the pin therefrom.

3. The kitchen utensil, as set forth in claim 1;
   (i) and in which a limit stop is secured to each pin between the handle on that pin and the article of impaled food thereon, whereby the pin handle will be exposed for grasping by a person without interference by the impaled article of food.

4. The kitchen utensil, as set forth in claim 1;
   (j) and in which the lid is provided with a circumferential groove in that face thereof from which the skewer pins project, this groove being positioned to fit over the marginal rim of the container when the pins project downwardly into the cooking medium, and this groove being located to circumscribe all of the pins when the lid is inverted so that the pins project upwardly so that cooking medium draining from the articles of impaled food may flow into the groove and be caught thereby.

References Cited

UNITED STATES PATENTS

| 241,631 | 5/1881 | Duffy | 99—414 |
| 281,683 | 7/1883 | Gibson. | |
| 1,706,491 | 3/1929 | Jenkins. | |
| 1,860,577 | 5/1932 | Hedge. | |
| 1,887,219 | 11/1932 | Stranszky. | |
| 2,102,542 | 12/1937 | Markle. | |
| 2,239,862 | 4/1941 | Scalph et al. | 99—391 |

WILLIAM I. PRICE, Primary Examiner

ARTHUR O. HENDERSON, Assistant Examiner

U.S. Cl. X.R.

99—419, 421

PO-1050
(5/69)

UNITED STATES PATENT OFFICE
CERTIFICATE OF CORRECTION

Patent No. 3,466,999      Dated September 16, 1969

Inventor(s) Julio G. Yanez-Pastor and Jenny Yanez-Pastor

It is certified that error appears in the above-identified patent and that said Letters Patent are hereby corrected as shown below:

Column 4: Line 18, after the word "claim", the numeral "1" should read --2--; line 25, "(j)" should read --(h)--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents